US008593958B2

(12) United States Patent
Zhang

(10) Patent No.: US 8,593,958 B2
(45) Date of Patent: Nov. 26, 2013

(54) NETWORK-WIDE FLOW MONITORING IN SPLIT ARCHITECTURE NETWORKS

(75) Inventor: Ying Zhang, San Jose, CA (US)

(73) Assignee: Telefonaktiebologet L M Ericsson (PUBL), Stockholm (SE)

(*) Notice: Subject to any disclaimer, the term of this patent is extended or adjusted under 35 U.S.C. 154(b) by 174 days.

(21) Appl. No.: 13/232,719

(22) Filed: Sep. 14, 2011

(65) Prior Publication Data
US 2013/0064079 A1 Mar. 14, 2013

(51) Int. Cl.
G08C 15/00 (2006.01)
(52) U.S. Cl.
USPC ......... 370/230.1; 370/232; 370/237; 370/238
(58) Field of Classification Search
USPC ................................................. 370/229–238
See application file for complete search history.

(56) References Cited

U.S. PATENT DOCUMENTS 6,842,463 B1 * 1/2005 Drwiega et al. ............... 370/235

OTHER PUBLICATIONS

Raza, Saqib, et al., "MeasuRouting: A Framework for Routing Assisted Traffic Monitoring", *INFOCOM, 2010 Proceedings IEEE*, IEEE, Piscatawa, NJ, USA, Mar. 14, 2013, pp. 1-9, XP031674806, ISBN: 978-1-4244-5836-3.
Barakat, Chadi, "Ranking Flows from Sampled Traffic", In *Proceedings of the 2005 ACM Conference on Emerging Network Experiment and Technology* (Toulouse, France Oct. 24-27, 2005 CoNEXT '05. ACM Press, New York, NY pp. 188-199.
Brunner, D., et al., "Probablistic Decentralized Network Management", in *Proceedings of the 11th IFIP/IEEE International Conference on Symposium on Integrated Network Management*, IM'09, pp. 25-32, 2009.
Claise, B., "Cisco Systems NetFlow Services Export Version 9", *RFC 3954*, Oct. 2004, 33 pages.
Hohn, Nicolas, et al., "Inverting Sampled Traffic", in *Proceedings of IMC*, Oct. 27-29, 2003, 12 pages.
McKeown, N., "OpenFlow: Enabling Innovation in Campus Networks", *ACM SIGCOMM Computer Communications Review*; vol. 38, No. 2, Apr. 2008, pp. 69-74.
Othman, Othman, et al., "Design and Implementation of Application Based Routing Using OpenFlow", in *Proceedings of the 5th International Conference on Future Internet Technologies*, CFI '10, pp. 60-67, 2010.
Roughan, Matthew, et al., "Experience in Measuring Internet Backbone Traffic Variability: Modesl, Metrics, Measurements and Meaning", In *Proc. of International Teletraffic Congress (ITC)* (2003), 9 pages.
Zhang, Yin, et al., "An Information-Theortic Approach to Traffic Matrix Estimation", SIGCOMM '03, Aug. 25-29, 2003, 11 pages.

* cited by examiner

*Primary Examiner* — Kerri Rose
(74) *Attorney, Agent, or Firm* — Blakely Sokoloff Taylor & Zafman LLP

(57) ABSTRACT

Flow monitoring tasks are assigned to a set of switches in a split architecture network to optimize network-wide flow monitoring. The assignment maximizes the number of monitored flows and reduces overhead of the flow monitoring. A controller receives an estimated traffic volume for each path in the network. The controller calculates, for all of the switches and all of the paths, sampling fractions that maximize the number of the flows sampled by the switches. In response to a request for setting up a new flow to traverse one of the paths in the network, the controller assigns the new flow to one of the switches that are located on the one of the paths, based on the sampling fraction for the assigned switch and the one of the paths, the bandwidth constraint and the memory constraint.

18 Claims, 5 Drawing Sheets

OPERATION OVERVIEW

OPERATION OVERVIEW

NETWORK-WIDE FLOW MONITORING IN SPLIT ARCHITECTURE NETWORKS

FIELD

Embodiments of the invention relate to the field of split architecture networks; and more specifically, to flow monitoring in split architecture networks.

BACKGROUND

Network service providers need to routinely collect flow-level measurements to guide the execution of network management applications. The flow information can be used for customer accounting and traffic engineering, which largely rely on aggregate traffic volume statistics. As the complexity of network management increases, flow monitoring is more and more needed for a number of critical network management tasks, such as anomaly detection, identification of unwanted application traffic, and forensic analysis. This analysis needs to identify and analyze as many distinct flows as possible. One consequence of this increased complexity is a growing demand for fine-grained flow measurements. However, network operators usually do not have prior knowledge of the detailed measurement tasks that the monitoring infrastructure needs to perform. One example of this is security applications. For example, a specific network prefix that is "below the radar" for traffic engineering purposes may play an important role in the early detection of anomalies.

Conventional flow monitoring solutions are inadequate for many of these network management applications. It is a challenging task to develop a flow monitoring technique that is both fine-grained and accurate. Due to computational and storage resource constraints, conventional routers cannot record all packets or flows that pass through them. Thus, there have been a variety of sampling techniques proposed to selectively record as many packets as the routers' CPUs and memory resources allow. For example, many router vendors today implement uniform packet sampling, such as the sampling mechanism provided by NetFlow (see, Cisco Systems NetFlow Services Export Version 9. RFC 3954). In the NetFlow sampling, each router independently selects a packet with a sampling probability (typically between 0.001 and 0.01) and aggregates the selected packets into flow records. This approach is simple so as to be technically feasible. It introduces only a small overhead to the router. However, this approach also reduces the overall quality of other applications that use the flow-level measurement results.

Therefore, existing sampling techniques are not sufficient for the increasing demand of new network management applications. One solution is to continuously increase router computational and storage capabilities. At one extreme, passive monitoring equipment, which captures every packet on a link, allows highly accurate measurements. However, such an approach scales very poorly for large networks, given the high unit cost for deployment and maintenance.

SUMMARY

A method, a system and a network element functioning as a controller in a split architecture network are described. According to embodiments of the invention, flow monitoring tasks are assigned to a set of switches in the network to optimize network-wide flow monitoring. The assignment maximizes the number of monitored flows and reduces overhead of the flow monitoring. Each of the switches samples flows as directed by the controller, wherein each of the switches samples the flows by monitoring a subset of the flows and recording measurements of the subset of the flows. Each of the flows traverses the network via a path defined by one of a set of (Origin, Destination) ("OD") pairs, wherein the Origin is an ingress one of the switches from which the flow enters the network and the Destination is an egress one of the switches from which the flow exits the network.

In one embodiment, the method comprises: receiving, by the controller, an input including an estimated traffic volume for each of the paths defined by each of the OD pairs; calculating, for all of the switches and all of the paths, sampling fractions that maximize the number of the flows sampled by the switches. The sampling fraction for a given switch and a given path is defined as the number of flows that pass through the given switch and the given path and are sampled by the given switch divided by the total number of the flows that pass through the given path, the calculating being based on the estimated traffic volume and subject to a bandwidth constraint and a memory constraint of the switches; receiving a request to set up a new flow to traverse one of the paths in the network; and assigning the new flow to one of the switches that are located on the one of the paths, based on the sampling fraction for the assigned switch and the one of the paths, the bandwidth constraint and the memory constraint.

In one embodiment, the system comprises: a controller to direct forwarding and sampling of the flows; and a set of switches coupled to the controller via the network. The controller comprises memory to store an estimated traffic volume for each of the paths defined by each of the OD pairs; a processor coupled to the memory, the processor adapted to calculate, for all of the switches and all of the paths, sampling fractions that maximize the number of the flows sampled by all of the switches. The sampling fraction for a given switch and a given path is defined as the number of flows that passes through the given path and are sampled by the given switch divided by the total number of the flows that pass through the given path, the calculating being based on the estimated traffic volume and subject to a bandwidth constraint and a memory constraint of the switches. The controller also comprises a network interface to receive a request to set up a new flow to traverse one of the paths in the network, wherein the request causes the processor to assign the new flow to one of the switches that are located on the one of the paths, based on the sampling fraction for the assigned switch and the one of the paths, the bandwidth constraint and the memory constraint.

In one embodiment, the network element functioning as a controller comprises: memory to store an estimated traffic volume for each of the paths defined by each of the OD pairs; a processor coupled to the memory, the processor adapted to calculate, for all of the switches and all of the paths, sampling fractions that maximize the number of the flows sampled by the switches. The sampling fraction for a given switch and a given path is defined as the number of flows that pass through the given switch and the given path and are sampled by the given switch divided by the total number of the flows that pass through the given path, the calculating being based on the estimated traffic volume and subject to a bandwidth constraint and a memory constraint of the switches. The network element also comprises a network interface to receive a request to set up a new flow to traverse one of the paths in the network, wherein the request causes the processor to assign the new flow to one of the switches that are located on the one of the paths, based on the sampling fraction for the assigned switch and the one of the paths, the bandwidth constraint and the memory constraint.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Figure 1:
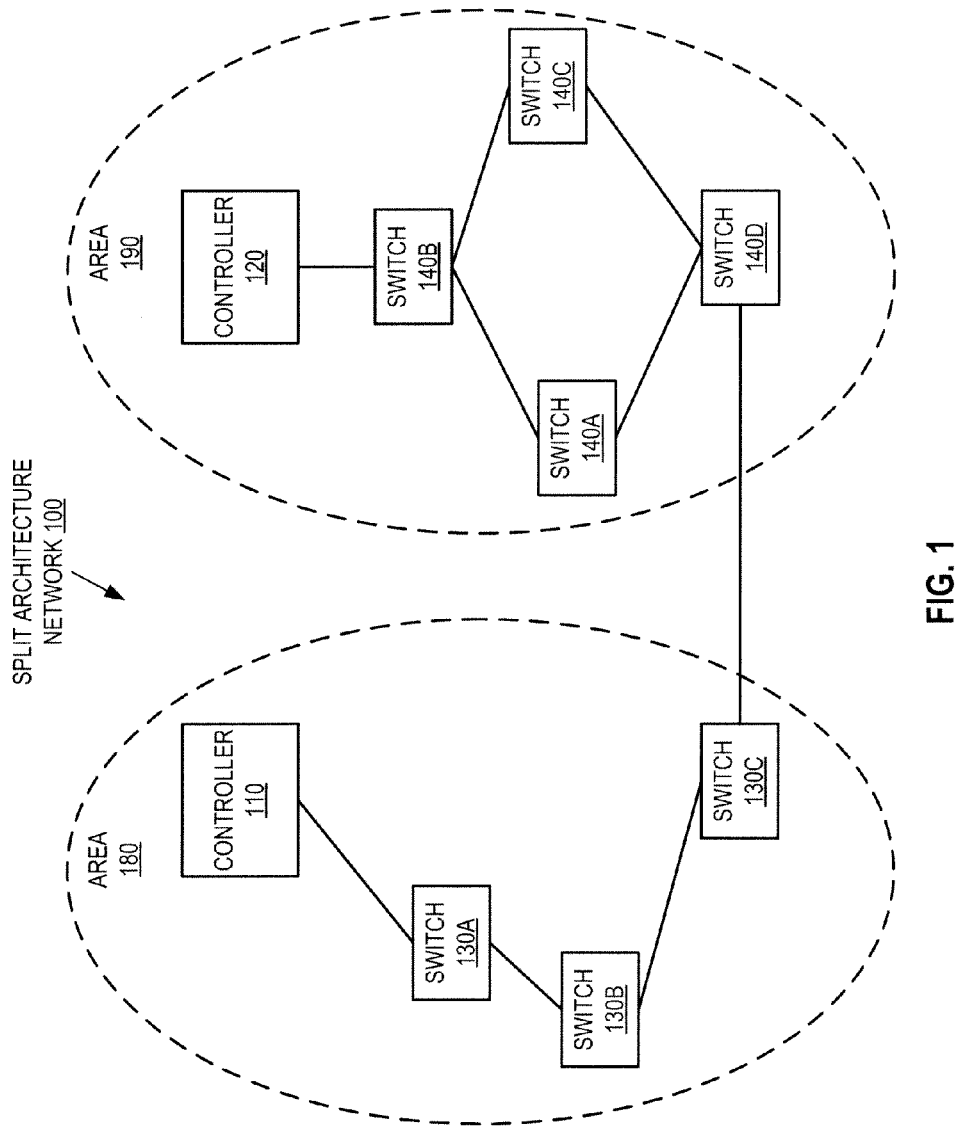
FIG. 1 illustrates an embodiment of a split architecture network in which flow monitoring is performed.

FIG. 1 illustrates an embodiment of a split architecture network 100 that includes a number of controllers (e.g., controllers 110 and 120) and a number of switches (e.g., switches 130A-C and 140A-D). Each controller is coupled to a set of switches that are managed by the controller; e.g., the controller 110 is coupled to the switches 130A-C, and the controller 120 is coupled to the switches 140A-D. Each controller manages the data packet flows in a predetermined area; e.g., the controller 110 manages the flows in an area 180, and the controller 120 manages the flows in an area 190.

It is understood that the topology of the split architecture network 100 is simplified for ease of illustration. A split architecture network can include any number of controllers and any number of switches. Each controller (110, 120) defines the interconnection and routing among the set of switches that it manages (that is, in the same area 180 as the controller). Each controller (110, 120) also handles network state distribution, such as collecting information from the set of switches and distributing routing instructions to the switches. Each controller (110, 120) can also be programmed to support new addressing, routing, and complex packet processing applications. That is, the controllers 110 and 120 are the "brain" of the network 100. Each switch (130A-C, 140A-D) needs to connect to at least one controller to function correctly.

For example, when the switch 130C receives a new flow without knowing where to send the packet, the switch 130C forwards the packet to its controller 110. Upon receiving the packet, the controller 110 directs the switch 130C regarding where to forward the new flow. The forwarding rule is then installed on the switch 130C to handle future packets belonging to the same flow.

A split architecture network, such as the split architecture network 100, is a distributed system in which the control plane is decoupled from the forwarding plane. The control plane includes a network-wide control platform, such as a small number of controllers (e.g., the controllers 110 and 120). In one embodiment, the controllers 110 and 120 run on one or more servers in the network 100 and instruct the forwarding behavior of a set of simple, interconnected forwarding elements, such as switches (e.g., the switches 130A-C and 140A-D). The decoupling of the control and forwarding planes contrasts to the architecture of a traditional router in which the control plane and the forwarding plane are tightly coupled in the same box. The integrated design of the router usually results in overly complicated control plane and complex network management. This complexity of the router creates a high barrier to the development of new protocols and network upgrades. In the traditional network, there is no centralized entity that holds the whole picture of the network.

Figure 2:
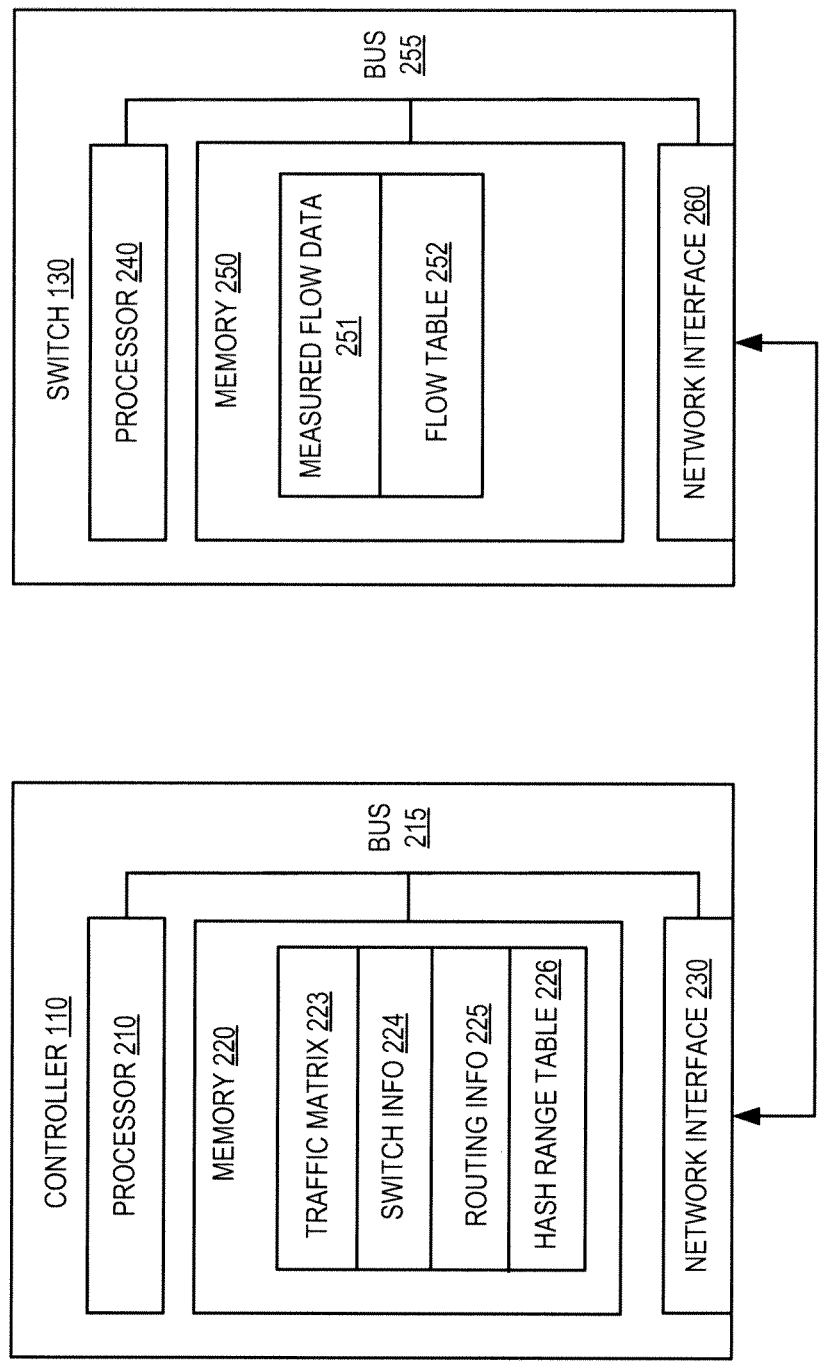
FIG. 2 illustrates an embodiment of a controller and a switch in a split architecture network.

FIG. 2 illustrates an embodiment of the controller 110 and a switch 130 in the split architecture network 100 of FIG. 1. It is understood that other controllers (e.g., the controller 120) and switches (e.g., the switches 130A-C and 140A-D) in the split architecture network 100 can include the same components as the controller 110 and the switch 130, respectively.

In one embodiment, the switch 130 functions as a forwarding element that forwards packets from an ingress port to an egress port, according to the rules in a flow table 252. In one embodiment, the switch 130 includes a processor 240 coupled to a memory 250, and a set of network interfaces, e.g. 260, for communicating with other network elements (e.g., controllers and switches) in the network 100. The memory 250 stores measured flow data 251 and the flow table 252. The measured flow data 251 records the measurement of the flows that are monitored and sampled by the switch 130. The flow table 252 can be programmed by the processor 240, under the control of the controller 110, to record the rules for forwarding packets from an ingress port to an egress port. Each flow entry in the flow table 252 is a rule that contains a set of actions such as forwarding packets to a given port, modifying certain bits in the packet header, encapsulating packets to the controller, or simply dropping the packets. For the first packet in a new flow, the switch 130 can forward the packet to the controller 110 to trigger the programming of a new flow entry into its flow table 252. The switch 130 can also forward all of the slow-path packets (such as Internet Control Message protocol (ICMP) packets) to the controller 110 for processing.

In one embodiment, the controller 110 includes a processor 210 coupled to a memory 220, and a network interface 230 for communicating with other network elements (e.g., controllers and switches) in the network 100. The memory 220 stores a traffic matrix 223, switch information 224, routing information 225 and a hash range table 226. The traffic matrix 223 stores estimated traffic volume for each of the paths (that is, "each OD pair path" as will be explained below) in the network. In one embodiment, the traffic matrix contains a set of entries. Each row of the traffic matrix corresponds to an ingress switch, and each column corresponds to an egress switch. Each entry in the traffic matrix contains a number (value) representing the number of flows that traverse on a path defined by a corresponding ingress switch in the same row and a corresponding egress switch in the same column. The switch information 224 stores memory, bandwidth, and processing information (or constraints) of each of the switches managed by the controller 110. The routing information 225 stores the path information among the switches managed by the controller 110. For example, for each ingress switch and egress switch from which a flow enters and exits the network, respectively, the routing information 225 stores a list of the other switches that form a path between the ingress switch and the egress switch. In one embodiment, the routing information 225 also contains information for keeping track of assigned flows for each of the switches managed by the controller 110. The hash range table 226 is used in an embodiment where cross-controller coordination is implemented. The hash range table 226 stores one or more of hash ranges assigned to the controller 110. The controller 110 uses these hash ranges to determine whether it is responsible for handling a given flow. The cross-controller coordination will be described in greater detail with reference to FIG. 5.

Before describing the details of the network-wide flow monitoring technique according to embodiments of the invention, it is useful to first explain some terminology.

Flow. A flow (also referred to as "packet flow" or "data flow") of traffic is a set of packets with a common property, known as a flow key, observed within a period of time. Thus, the term "flow" herein can be defined broadly, e.g., data traffic on a Transmission Control Protocol (TCP) connection, or all traffic from a particular Media Access Control (MAC) address or Internet Protocol (IP) address. Switches construct and export summary statistics on packet flows that pass through them. The flow key is usually specified by the fields in the packet header, such as the Internet Protocol (IP) source and destination addresses and Transmission Control Protocol (TCP)/User Datagram Protocol (UDP) port numbers. Flows in which the flow key is specified by individual values of these fields are called raw flows, as opposed to aggregate flows in which the flow key is specified by a range of these quantities. Whether a set of packets is to be included in a flow depends on the algorithm used by the controller to assign packets to flows.

Flow Record. A flow record can be created as follows. When a packet arrives at a switch, the switch determines whether the flow is active; that is, whether the statistics are currently being collected for the packet's flow key. If not, the switch instantiates a new set of statistics for the flow key. The statistics include counters for packets and bytes that are updated for each packet matching the flow key. When the switch determines that the flow is terminated, the flow's statistics are exported as a flow record and the associated memory is released for use by new flows. A switch can terminate a flow if one of the following criteria is met: (i) inactive flow or inter-packet timeout; that is, the time since the last packet observed for the flow exceeds some threshold; (ii) protocol level information, such as a TCP FIN packet that terminates a TCP connection; (iii) memory management; that is, termination to release memory for new flows; (iv) active flow timeout; that is, to prevent data staleness, flows are terminated after a given elapsed time since the arrival of the first packet of the flow.

Packet Sampling and Flow Sampling. In general, there are two types of sampling methods. With packet sampling, a subset of packets is sampled and the statistics of the sampled packets is collected and measured. With flow sampling, a subset of flows is sampled and the statistics of the sampled flows is collected and measured. Flow sampling preserves the flows intact, as the sampling is performed on the flows (instead of the individual packets within the flows). In practice, any attempt to gather flow statistics involves classifying individual packets into flows. The meta-data of all of the packets has to be organized into flows before flow sampling can take place. Thus, flow sampling generally involves more CPU load and more memory than packet sampling.

Ideally, network operators need an accurate monitoring infrastructure that provides visibility over the entire network. However, the high traffic volumes in the networks and the burden on controllers/switches have resulted in the need to control the consumption of resources in the measurement infrastructure. There are several constraints that lead to the conventional use of packet sampling: the size of the record buffer, report bandwidth, CPU speed, and record look-up time.

However, packet sampling has an inherent problem of being biased toward large flows. Thus, packet sampling usually results in poor flow coverage. As a result, packet sampling does not satisfy the requirements of many classes of security applications, such as anomaly detection. In addition, this bias increases redundant flow reporting collected by different switches.

Conventional flow sampling also has its drawbacks. While it is reasonable to assume that the probability of a single packet being sampled multiple times across routers is negligible, this assumption is not valid in the context of flow-level monitoring. The probability of two switches sampling the same flow is high as flow sizes follow heavy-tailed distributions. Therefore, from the network-wide view, having duplicated flow records on different switches is a waste of network resource.

Choice of Sampling Rate. There is an inherent tradeoff between the flow coverage and overhead in resources such as reporting bandwidth and load. Given the trade-offs between coverage and the overhead, network operators face a decision of which switch to enable the sampling and under what sampling rate. There can be two options:

Enable flow monitoring on all switches but using very low sampling rates to minimize potential network impact, or Enable flow monitoring on a chosen set of switches where the sampling rates are set depending on the measurement task and the target accuracy.

Currently, the first option is the one followed by most Internet Service Providers (ISPs) because no automated method exists for the second. However, the effect of the first option highly depends on the impact of the sampling method. Given the low sampling rate, the measurement is usually less accurate. The first option can only provide simple statistics but not for applications that require higher accuracy.

Embodiments of the invention use flow sampling because flow sampling is generally better than other solutions in terms of flow coverage and avoidance of bias toward large flows. Flow sampling supports a popular set of security applications, such as detecting malware, distributed denial of service (DDoS) attacks, and other malicious attacks. Moreover, flow sampling preserves the accuracy of traffic volume estimation. Thus, the sampling results can be more suitable for traffic engineering applications. Further, the flow sampling technique described herein operates efficiently within switch resource constraints, taking into consideration of the trade-offs between the generality across applications and flow coverage.

Embodiments of the invention provide a new network-wide flow monitoring approach in a split architecture network with de-coupled control and forwarding planes. One example of a split architecture network is the split architecture network 100 of FIG. 1. In a split architecture network with a centralized controller, there is a unique opportunity for designing a new network-wide flow sampling methodology to achieve a better trade-offs between monitoring accuracy and cost. Embodiments of the invention are useful for general traffic monitoring in next generation networks deployed with the split architecture. It can also be applied to any network with a centralized controller for routing, such as the Generalized Multi-Protocol Label Switching (GMPLS) networks.

A split architecture network with a centralized controller is able to perform intelligent flow monitoring. The centralized controller determines which switch should monitor which types of flow with what sampling rate. The use of the centralized controller avoids the independent decision process performed by conventional routers, which record flow measurements completely independently of each other, and, therefore, is the fundamental reason for redundant flow measurements and inefficient use of router resources.

According to embodiments of the invention, the centralized controller can run an application that coordinates monitoring responsibilities across different switches. This coordination can significantly increase the coverage and accuracy of network-wide flow monitoring capabilities. The flow monitoring technique described herein can operate on an Enterprise network, an Autonomous System (AS), or a mobile backhaul and mobile core transport network. The network includes one or more controllers and one or more sets of switches. Each switch has a basic sampling mechanism. The sampled data (which is the collected/measured statistics) can be sent back to a flow collection server in the network.

The network-wide flow monitoring technique described herein has the following features:
  Providing high flow coverage, including both large flows and small flows.
  Minimizing redundant reports in the overall measurement from all sampling entities.
  Satisfying network-wide flow monitoring objectives, allowing the operator to flexibly specify any subset of traffic that should be monitored more accurately than others. The operator can also specify criteria based on other objectives such as ensuring fairness across different subsets of traffic.
  Considering the overhead on the switch, such that the sampling does not overload the switch, i.e. within the switch resource constraints.

In the following, the details of the flow monitoring technique are described. First, the problem of network-wide optimizations formulated and a solution using linear optimization is described. Second, the splitting of sampling tasks across multiple split architecture domains is described. To that end, a hash based algorithm is introduced that guarantees no duplication between samples in different domains. The optimization can be pre-computed offline and its output can be used by the controller in real time to assign the sampling tasks to switches. Alternatively, the optimization algorithm and the hash based algorithm can both be run on the controller in real time.

Figure 3:
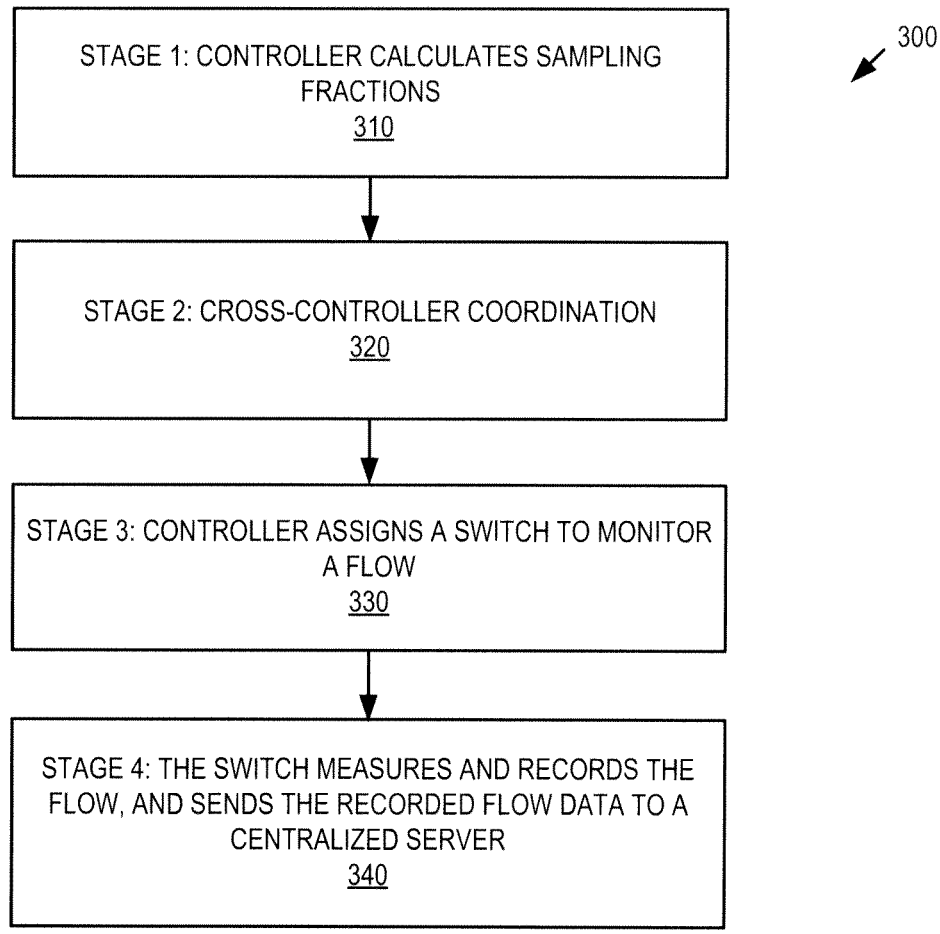
FIG. 3 is a flow diagram illustrating an embodiment of a method for network-wide flow monitoring.

FIG. 3 illustrates an embodiment of a method 300 for flow monitoring in a split architecture network. In one embodiment, the method 300 is performed by controllers and switches in a split architecture network, such as the split architecture network 100 of FIG. 1. The method 300 provides an overview of the operations of the controllers and switches in terms of four stages. Further details of the operations will be described below with reference to FIG. 4 and FIG. 5.

In one embodiment, at the first stage, a controller calculates sampling fractions (block 310). A sampling fraction for a given switch and a given path, as will be defined mathematically below, is defined to be the number of flows that pass through the given switch and the given path and are sampled by the given switch, divided by the total number of the flows that pass through the given switch and the given path. After the sampling fractions are computed, at the second stage, the controller performs cross-controller coordination (block 320). The result of the cross-controller coordination indicates whether the controller is responsible for managing the flow. If the controller is responsible for managing the flow, at the third stage, the controller determines which of its switches should be assigned with the task of flow monitoring (block 330). At the fourth stage, the assigned switch measures and records the flow, and sends the recorded flow data to a centralized server (block 340).

Network-wide optimization. To determine which switch should be assigned a flow monitoring task, an optimization framework is used to specify and satisfy network-wide monitoring objectives under the switches' resource constraints. The output of this optimization is stored in the controller as a sampling template. When a new flow reaches a switch, the switch informs the controller of the new flow. The controller sends a flow entry to the switch, instructing the switching where to forward the flow and whether the switch should sample this flow. The flow entry is stored in the switch for a predetermined amount of period to guide the switch with respect to the incoming packets of the same flow.

In one embodiment, the assignment can be modeled as an optimization problem. A first input to the optimization problem is an estimated traffic matrix. Network operators usually maintain an estimated traffic matrix that records the traffic volume between any pair of ingress and egress switches. The rows of the traffic matrix correspond to the ingress switches and the columns correspond to the egress switch. Each pair of the ingress/egress combination is known as an Origin-Destination (OD) pair. Each entry in the traffic matrix is the estimated traffic volume between the corresponding OD pair. In one embodiment, the estimated traffic volume is represented by the number of flows. In some embodiments, the entries can be adjusted dynamically by the controller.

Another input to the optimization problem is the routing information. In one embodiment, the controller stores the switch level paths between any OD pairs. This information is available in the controller to provide flow entries to each switch. It is assumed that there is only one switch level path between any given OD pair. Further, the controller also stores or receives the resource constraints of each of the switches associated with the controller.

In the following, $P_i$ is defined to be the path (also referred to as "OD path") between an OD-pair $OD_i$ ($i \in [1,N]$), and $T_i$ is the number of flows on $P_i$. N is the total number of OD pairs. Each path consists of a set of switches $S_j$, ($j \in [1,K]$). Each switch has a maximum resource limit. The resource limit can be imposed by the memory constraint as the maximum number of per-flow counters in the memory (e.g., static random access memory (SRAM)), and/or resource limit can be imposed by the bandwidth constraint as the bandwidth for reporting flow records back to a centralized server for storage. Additionally or alternatively, the resource limit can be imposed by the processing constraint of the switch for processing incoming packets. The algorithm described herein considers both the memory constraints $M_j$ and the bandwidth constrains $B_j$, which correspond to the maximum flow entries that can be stored on switch $S_j$, and the number of flows that can be reported per measurement interval, respectively. It is understood that constraints other than $M_j$ and $B_j$ can also be considered.

In the following, defined $d_{ij}$ to be the sampling fraction of the flows on $P_i$ that is recorded (i.e., sampled, collected or measured) by switch $S_j$. If $d_{ij} > 0$, then switch $S_j$ records at least some fraction of the flow that traverses $P_i$. Therefore, $f_i = \Sigma^{M}_{j=1} d_{ij}$ is the total fraction of flows on $P_i$ that are monitored, indicating the coverage of the flow monitoring strategy.

In one embodiment, the assignment of monitoring tasks can be modeled as an optimization problem. The objective of the optimization is to maximize the total number of flows monitored (i.e., sampled) across all switches, i.e., Max $\Sigma_i$ $(f_i \times T_i)$, assuming that $T_i$ is known. The optimization is subject to the capacity constraints on each switch. Formally, the optimization problem is defined below:

Objective: Maximize $\Sigma(f_i \times T_i)$, subject to

1) $\forall j, c\Sigma_i(T_i \times d_{ij}) < B_j$      (Equation 1)

2) $\forall j, c\Sigma_i(T_i \times d_{ij}) < M_j$      (Equation 2)

3) $f_i = \Sigma^M_{j=1} d_{ij}$      (Equation 3)

4) $\forall i,j, 0 \le d_{ij} \le 1$      (Equation 4)

5) $\forall i, 0 < f_i < 1$.      (Equation 5)

As indicated above, the optimization is subject to five constraints. The first constraint ensures that the amount of flow records generated by switch $S_i$ in a fix interval does not exceed the amount of bandwidth $B_j$, which is allocated for sending the data back to a centralized server. The constant c is the size of the record for each flow in the fixed interval. Similarly, the second constraint indicates that the storage on each switch does not exceed the maximum memory capacity. The third constraint is the definition of the total fraction of flows covered, which should be a sum of each switch along the ODi path. Since $d_{ij}$ is a fraction, it should be a value between 0 and 1. The same constraint applies to $f_i$.

In one embodiment, linear programming (LP) techniques can be used to solve the optimization problem to obtain the sampling fractions $(d_{ij})$ for all i and j. Linear programming is commonly known in the field of mathematical programming and, therefore, it is not described herein.

In the next step, the controller use the algorithm in Table 1 to instruct which switch should monitor which flow. The algorithm aims at balancing the load among the switches. It also ensures that the sets of flow assigned to different switches do not overlap. In other words, each flow will be monitored by one switch along an OD path.

TABLE 1

Sampling Task Assignment Algorithm

Figure 4:
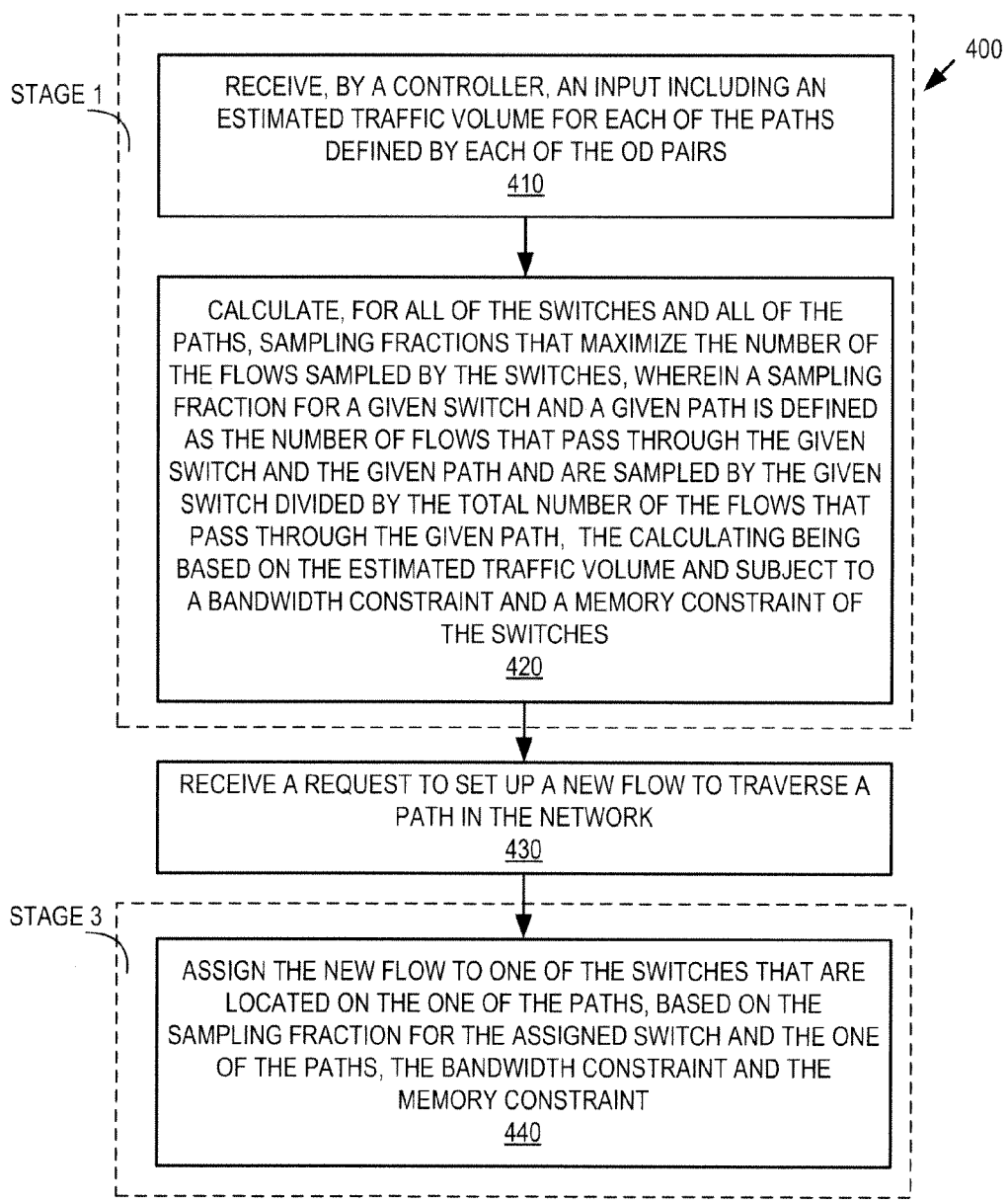
FIG. 4 is a flow diagram illustrating an embodiment of a method for optimizing the assignment of flows to the switches associated with a controller.

Algorithm 1 Sampling Task Assignment per Switch
procedureAssignSamplingTask(R,Δ,
B,M,f)
  1:    Compute the path p from R for the new flow f with OD pair $OD_i$
  2:    for Every switch $S_j$ in path p do
  3:        if (ASSIGNED($OD_i,S_j$) < $\delta_{ij}$)
           &(c × ASSIGNED($S_j$) < $B_j$)&
           (c × ASSIGNED($S_j$) < $M_j$) then
  4:          Assign f to $S_j$:
  5:          Update ASSIGNED($S_j$)
  6:          Update ASSIGNED($OD_i,S_j$)
  7:          Break:
  8:       end if
  9:    end for FIG. 4 illustrates an embodiment of a method 400 for optimizing the assignment of flows to the switches associated with a controller. In one embodiment, the method 400 is performed by a controller, such as controller 110 or 120 of FIG. 1. The operations of the method 400 correspond to the stage 1 and stage 3 of the method 300 shown in FIG. 3. Stage 2 of the method 300 can also be performed in an embodiment where cross-controller coordination is implemented.

In one embodiment, a controller receives an input including an estimated traffic volume for each of the paths defined by each of the OD pairs (block 410). The controller also has access to the resource constraints at each of its associated (i.e., managed) switches. The controller computes sampling fractions to maximize the number of the flows sampled by the switches, wherein a sampling fraction for a given switch and a given path is defined as the number of flows that pass through the given switch and the given path and are sampled by the given switch divided by the total number of the flows that pass through the given path (block 420). The calculation is based on the estimated traffic volume and subject to a bandwidth constraint and a memory constraint of the switches. In one embodiment, the computation of block 420 is performed with linear programming. After the sampling fractions are computed, the controller receives a request to set up a new flow to traverse a path in the network (block 430). If the controller is responsible for managing the new flow (e.g., as determined by the cross-controller coordination described with reference to FIG. 5), the controller assigns the new flow to one of the switches that are located on the one of the paths, based on the sampling fraction for the assigned switch and the one of the paths, the bandwidth constraint and the memory constraint (block 440). In one embodiment, the switch assignment is based on the algorithm described in Table 1. That is, the controller examines each switch along the OD path to determine whether the switch has reached its sampling fraction, bandwidth constraint and memory constraint. If not, the controller assigned the flow sampling task to that switch. Otherwise, the flow sampling task is assigned to another switch (e.g., the next switch) in the path.

Cross-Controller Hash-Based Coordination. In one embodiment, a hash-based selection algorithm is used to eliminate duplicate measurements across switches associated with different controllers. This allows switches controlled by different controllers to monitor disjoint sets of flows without requiring explicit communication between the controllers. The hash-based selection algorithm can help eliminate redundant measurements across the network.

For example, an ISP can operate multiple network areas and some or most of the flows can traverse across multiple areas. Thus, there is a need for coordination between controllers to avoid monitoring duplicated entries. If each controller operates in isolation, the resulting measurements from different routers are likely to contain duplicates. Table 2 shows an algorithm for the cross-controller coordination.

TABLE 2

Cross-controller coordination

Algorithm 2 Hash Based Assignment Across Controllers
procedureRangeAssignPerController(f,RANGE,C)
  1:    $h_f$ = HASH(FLOW_IDENTIFIER(f))
  2:    if $h_f \in$ RANGE(C) then
  3:        Get Topology R. assignment metric Δ. capacity B.M for controller C.
  4:        AssignSamplingTask(R.Δ. B.M.f)
  5:    end if In one embodiment, each controller has a sampling manifest, which is a table of hash ranges indexed with a hash key. One or more of the hash ranges are assigned to each controller. Upon receiving a packet, the controller looks up the hash ranges using a hash key derived from the packet's header fields. It computes the hash of the packet's flow identifier in the header fields. If the hash value falls within the hash range (or ranges) assigned to the controller, the packet (as well as the associated flow) is to be sampled by the switches associated with the controller.

Hash-based sampling enables a simple and powerful coordination strategy to avoid duplicate measurements among switches under different controllers. Controllers are configured to use the same hash function, but are assigned disjoint hash ranges so that the hash of any flow will match at most one controller's hash range. Therefore, the sets of flows sampled by different switches associated with different controllers will not overlap. By assigning non-overlapping hash ranges, cross-controller coordination can be achieved without explicit communication or complex distributed protocols.

Figure 5:
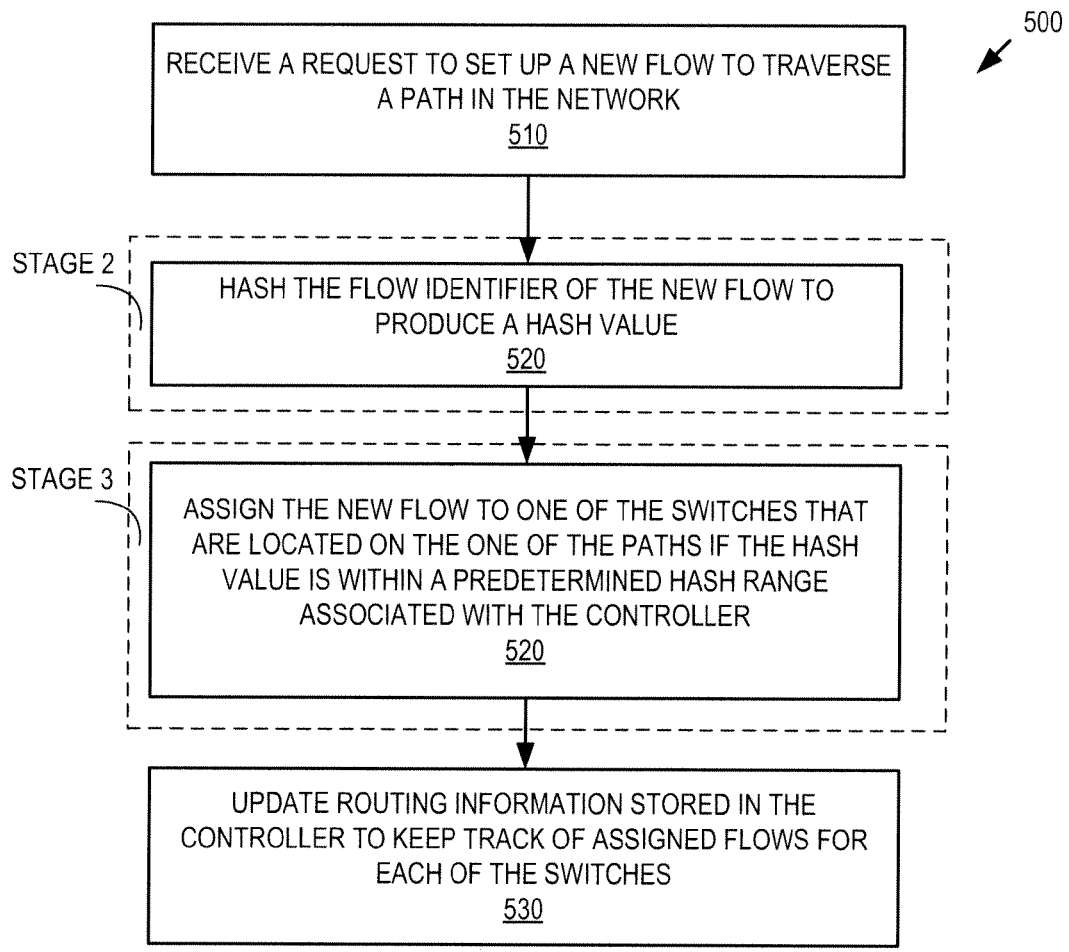
FIG. 5 is a flow diagram illustrating an embodiment of a method for cross-controller coordination.

FIG. 5 illustrates one embodiment of a method for coordinating the sampling tasks among multiple controllers. In one embodiment, the method 500 is performed by controllers of a split architecture network, such as controllers 110 and 120 of FIG. 1. The operations of the method 500 correspond to the stage 2 and stage 3 of the method 300 shown in FIG. 3.

In one embodiment, a controller receives a request to set up a new flow to traverse a path in the network (block 510). In one embodiment, the switch that receives the new flow reports to its controller, and that controller informs all of the other controllers in the network. In an alternative embodiment, the switch that receives the new flow reports to a centralized server, and that centralized server informs all of the controllers in the network. The controller (as well as the other controllers in the network) hashes the flow identifier of the new flow to produce a hash value (block 520). If the hash value falls into the controller's hash range, the controller assigns the new flow to one of the switches that are located on the one of the paths (block 530). The switch assignment can be implemented by the method 400 of FIG. 4, which is based on the calculated sampling fraction for the assigned switch and the one of the paths, the bandwidth constraint and the memory constraint. The controller then updates the routing information stored in the controller to keep track of assigned flows for each of the switches (block 540). The controller assigns the new flow to one of its associated switches. The assigned switch can then proceed with the operation of block 340 of the method 300 (FIG. 3).

The operations of the flow diagrams of FIGS. 3-5 have been described with reference to the exemplary embodiment of FIG. 1 and FIG. 2. However, it should be understood that the operations of the flow diagrams of FIGS. 3-5 can be performed by embodiments of the invention other than those discussed with reference to FIG. 1 and FIG. 2, and the embodiments discussed with reference to FIG. 1 and FIG. 2 can perform operations different than those discussed with reference to the flow diagrams. While the flow diagrams of FIGS. 3-5 show a particular order of operations performed by certain embodiments of the invention, it should be understood that such order is exemplary (e.g., alternative embodiments may perform the operations in a different order, combine certain operations, overlap certain operations, etc.).

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method of a network element functioning as a controller for a split architecture network, the method for assigning flow monitoring tasks to a set of switches in the network to optimize network-wide flow monitoring by maximizing the number of monitored flows and reducing overhead of the flow monitoring, each of the switches to sample flows as directed by the controller, wherein each of the switches samples the flows by monitoring a subset of the flows and recording measurements of the subset of the flows, each of the flows to traverse the network via a path defined by one of a set of (Origin, Destination) ("OD") pairs, wherein the Origin is an ingress one of the switches from which the flow enters the network and the Destination is an egress one of the switches from which the flow exits the network, the method comprising the steps of:

receiving, by the controller, an input including an estimated traffic volume for each of the paths defined by each of the OD pairs;

calculating, for all of the switches and all of the paths, sampling fractions that maximize the number of the flows sampled by the switches, wherein a sampling fraction for a given switch and a given path is defined as the number of flows that pass through the given switch and the given path and are sampled by the given switch divided by a total number of the flows that pass through the given path, the calculating being based on the estimated traffic volume and subject to a bandwidth constraint and a memory constraint of the switches;

receiving a request to set up a new flow to traverse one of the paths in the network; and assigning the new flow to one of the switches that are located on the one of the paths, based on the sampling fraction for the assigned switch and the one of the paths, the bandwidth constraint and the memory constraint.

2. The method of claim 1, wherein the step of assigning further comprises the steps of:

identifying whether the new flow can be assigned to a first switch on the one of the paths ($P_i$) within the sampling fraction for the first switch and the path ($P_i$), the bandwidth constraint and the memory constraint; and if the first switch cannot accommodate the new flow, assigning the new flow to a second switch on the path ($P_i$) within the sampling fraction for the second switch and the path ($P_i$), the bandwidth constraint and the memory constraint.

3. The method of claim 1, wherein the network comprises a plurality of controllers that direct the switches to forward and sample the flows, the method further comprises the steps of:

hashing an identifier of the new flow to produce a hash value;

assigning, by the controller, the new flow to one of the switches that are located on the one of the paths if the hash value is within a predetermined hash range associated with the controller; and updating routing information stored in the controller to keep track of assigned flows for each of the switches.

4. The method of claim 1, wherein receiving the estimated traffic volume further comprises the step of:

receiving a traffic matrix that contains a set of entries, wherein rows of the traffic matrix correspond to ingress ones of the switches, columns of the traffic matrix correspond to egress ones of the switches, and each of the entries in the traffic matrix contains a number representing the number of flows that traverse on a path defined by a corresponding ingress switch in a same row and a corresponding egress switch in a same column.

5. A method of a network element functioning as a controller for a split architecture network, the method for assigning flow monitoring task to a set of switches in the network to optimize network-wide flow monitoring by maximizing the number of monitored flows and reducing overhead of the flow monitoring, each of the switches to sample flows as directed by the controller, wherein each of the switches samples the flows, each of the flows to traverse the network via a path defined by one of a set of (Origin, Destination) ("OD") pairs, wherein the Origin is an ingress one of the switches from which the flow enters the network and the Destination is an egress one of the switches from which the flow exits the network, the method comprising the steps of:

receiving, by the controller, an input including an estimated traffic volume for each of the paths defined by each of the OD pairs;

calculating, for all of the switches and all of the paths, sampling fractions that maximize the number of the flows sampled by the switches, wherein a sampling fraction for a given switch and a given path is defined as the number of flows that pass through the given switch and the given path and are sampled by the given switch divided by a total number of the flows that pass through the given path, the calculating being based on the estimated traffic volume and subject to a bandwidth constraint and a memory constraint of the switches;

receiving a request to set up a new flow to traverse one of the paths in the network; and assigning the new flow to one of the switches that are located on the one of the paths, based on the sampling fraction for the assigned switch and the one of the paths, the bandwidth constraint and the memory constraint, wherein $d_{ij}$ represents a sampling fraction for one of the switches ($S_j$) ($j \in [1,K]$) and one of the paths ($P_i$) ($i \in [1, N]$), the step of calculating further comprises the step of calculating the sampling fractions that maximize $\Sigma_i (f_i \times T_i)$, wherein $f_i = \Sigma^K_{j=1} d_{ij}$ is the total fraction of flows on the path ($P_i$) to be sampled, $T_i$ is the number of flows traversing on the path ($P_i$).

6. The method of claim 5, wherein the step of calculating further comprises the step of calculating the sampling fractions subject to the bandwidth constraint ($\forall j, c\Sigma_i (T_i \times d_{ij}) < B_j$) and the memory constraint of ($\forall j, c\Sigma_i (T_i \times d_{ij}) < M_j$), wherein c is a constant that represents a size of a flow record generated by sampling the flows.

7. A system of a split architecture network for assigning flow monitoring tasks to a set of switches in the network, the system to optimize network-wide flow monitoring by maximizing the number of monitored flows and reducing overhead of the flow monitoring, wherein each of the switches samples the flows by monitoring a subset of the flows and recording measurements of the subset of the flows, each of the flows to traverse the network via a path defined by one of a set of (Origin, Destination) ("OD") pairs, wherein the Origin is an ingress one of the switches from which the flow enters the network and the Destination is an egress one of the switches from which the flow exits the network, the system comprising:

a controller to direct forwarding and sampling of the flows; and the set of switches coupled to the controller via the network, wherein the controller comprises:

memory to store an estimated traffic volume for each of the paths defined by each of the OD pairs;

a processor coupled to the memory, the processor adapted to calculate, for all of the switches and all of the paths, sampling fractions that maximize the number of the flows sampled by the switches, wherein a sampling fraction for a given switch and a given path is defined as the number of flows that pass through the given switch and the given path and are sampled by the given switch divided by a total number of the flows that pass through the given path, the calculating being based on the estimated traffic volume and subject to a bandwidth constraint and a memory constraint of the switches; and a network interface to receive a request to set up a new flow to traverse one of the paths in the network, wherein the request causes the processor to assign the new flow to one of the switches that are located on the one of the paths, based on the sampling fraction for the assigned switch and the one of the paths, the bandwidth constraint and the memory constraint.

8. The system of claim 7, wherein, when assigning the new flow, the processor is adapted to:

identify whether the new flow can be assigned to a first switch on the one of the paths ($P_i$) within the sampling fraction for the first switch and the path ($P_i$), the bandwidth constraint and the memory constraint; and if the first switch cannot accommodate the new flow, assign the new flow to a second switch on the path ($P_i$) within the sampling fraction for the second switch and the path ($P_i$), the bandwidth constraint and the memory constraint.

9. The system of claim 7, further comprising a plurality of controllers that direct the switches to forward and sample the flows, wherein the processor of the controller is adapted to:

hash an identifier of the new flow to produce a hash value;

assign the new flow to one of the switches that are located on the one of the paths if the hash value is within a predetermined hash range associated with the controller; and update routing information stored in the controller to keep track of assigned flows for each of the switches.

10. The system of claim 7, wherein the estimated traffic volume stored is a traffic matrix that contains a set of entries, wherein rows of the traffic matrix correspond to ingress ones of the switches, columns of the traffic matrix correspond to egress ones of the switches, and each of the entries in the traffic matrix contains a number representing the number of flows that traverse on a path defined by a corresponding ingress switch in a same row and a corresponding egress switch in a same column.

11. A system of a split architecture network for assigning flow monitoring task to a set of switches in the network, the system to optimize network-wide flow monitoring by maximizing the number of monitored flows and reducing overhead of the flow monitoring, wherein each of the switches samples the flows by monitoring a subset of the flows and recording a measurements of the subset of the flows, each of the flows to traverse the network via a path defined by one of a set of (Origin, Destination) ("OD") pairs, wherein the Origin is an ingress one of the switches from which the flow enters the network and the Destination is an egress one of the switches from which the flow exits the network, the system comprising:

a controller to direct forwarding and sampling of the flows; and the set of switches coupled to the controller via the network, wherein the controller comprises:

memory to store an estimated traffic volume for each of the paths defined by each of the OD pairs;

a processor coupled to the memory, the processor adapted to calculate, for all of the switches and all of the paths, sampling fractions that maximize the number of the flows sampled by the switches, wherein a sampling fraction for a given switch and a given path is defined as the number of flows that pass through the given switch and the given path and are sampled by the given switch divided by a total number of the flows that pass through the given path, the calculating being based on the estimated traffic volume and subject to a bandwidth constraint and a memory constraint of the switches; and a network interface to receive a request to set up a new flow to traverse one of the paths in the network, wherein the request causes the processor to assign the new flow to one of the switches that are located on the one of the paths, based on the sampling fraction for the assigned switch and the one of the paths, the bandwidth constraint and the memory constraint, wherein $d_{ij}$ represents a sampling fraction for one of the switches ($S_j$) ($j \in [1,K]$) and one of the paths ($P_i$) ($i \in [1,N]$), wherein the process is adapted to calculate the sampling fractions that maximize $\Sigma_i$ ($f_i \times T_i$), wherein $f_i = \Sigma^K_{j=1} d_{ij}$ is the total fraction of flows on the path ($P_i$) to be sampled, $T_i$ is the number of flows traversing on the path ($P_i$).

12. The system of claim 11, wherein the sampling fractions ($d_{ij}$) are calculated subject to the bandwidth constraint ($\forall j$, $c\Sigma_i(T_i \times d_{ij}) < B_j$) and the memory constraint of ($\forall j$, $c\Sigma_i(T_i \times d_{ij}) < M_j$), wherein c is a constant that represents a size of a flow record generated by sampling the flows.

13. A network element functioning as a controller for a split architecture network, the network element for assigning flow monitoring tasks to a set of switches in the network to optimize network-wide flow monitoring by maximizing the number of monitored flows and reducing overhead of the flow monitoring, each of the switches to sample flows as directed by the network element, wherein each of the switches samples the flows by monitoring a subset of the flows and recording measurements of the subset of the flows, each of the flows to traverse the network via a path defined by one of a set of (Origin, Destination) ("OD") pairs, wherein the Origin is an ingress one of the switches from which the flow enters the network and the Destination is an egress one of the switches from which the flow exits the network, the network element comprising:

memory to store an estimated traffic volume for each of the paths defined by each of the OD pairs;

a processor coupled to the memory, the processor adapted to calculate, for all of the switches and all of the paths, sampling fractions that maximize the number of the flows sampled by the switches, wherein a sampling fraction for a given switch and a given path is defined as the number of flows that pass through the given switch and the given path and are sampled by the given switch divided by a total number of the flows that pass through the given path, the calculating being based on the estimated traffic volume and subject to a bandwidth constraint and a memory constraint of the switches; and a network interface to receive a request to set up a new flow to traverse one of the paths in the network, wherein the request causes the processor to assign the new flow to one of the switches that are located on the one of the paths, based on the sampling fraction for the assigned switch and the one of the paths, the bandwidth constraint and the memory constraint.

14. The network element of claim 13, wherein, when assigning the new flow, the processor is adapted to:

identify whether the new flow can be assigned to a first switch on the one of the paths ($P_i$) within the sampling fraction for the first switch and the path ($P_i$), the bandwidth constraint and the memory constraint; and if the first switch cannot accommodate the new flow, assign the new flow to a second switch on the path ($P_i$) within the sampling fraction for the second switch and the path ($P_i$), the bandwidth constraint and the memory constraint.

15. The network element of claim 13, wherein the controller is coupled via the network to a plurality of controllers that direct the switches to forward and sample the flows, wherein the processor of the controller is adapted to:

hash an identifier of the new flow to produce a hash value;

assign the new flow to one of the switches that are located on the one of the paths if the hash value is within a predetermined hash range associated with the controller; and update routing information stored in the controller to keep track of assigned flows for each of the switches.

16. The network element of claim 13, wherein the estimated traffic volume stored is a traffic matrix that contains a set of entries, wherein rows of the traffic matrix correspond to ingress ones of the switches, columns of the traffic matrix correspond to egress ones of the switches, and each of the entries in the traffic matrix contains a number representing the number of flows that traverse on a path defined by a corresponding ingress switch in a same row and a corresponding egress switch in a same column.

17. A network element functioning as a controller for a split architecture network, the network element for assigning flow monitoring tasks to a set of switches in the network of optimize network-wide flow monitoring by maximizing the number of monitored flows and reducing overhead of the flow monitoring, each of the switches to sample flows as directed by the network element, wherein each of the switches samples the flows by monitoring a subset of the flows and recording measurements of the subset of the flows, each of the flows to traverse the network via a path defined by one of a set of (Origin, Destination) ("OD") pairs, wherein the Origin is an ingress one of the switches from which the flow enters the network and the Destination is an egress one of the switches from which the flow exits the network, the network element comprising:

memory to store an estimated traffic volume for each of the paths defined by each of the OD pairs;

a processor coupled to the memory, the processor adapted to calculate, for all of the switches and all of the paths, sampling fractions that maximize the number of the flows sampled by the switches, wherein a sampling fraction for a given switch and a given path is defined as the number of flows that pass through the given switch and the given path and are sampled by the given switch divided by a total number of the flows that pass through the given path, the calculating being based on the estimated traffic volume and subject to a bandwidth constraint and a memory constraint of the switches; and a network interface to receive a request to set up a new flow to traverse one of the paths in the network, wherein the request causes the processor to assign the new flow to one of the switches that are located on the one of the paths, based on the sampling fraction for the assigned switch and one of the paths, the bandwidth constraint and the memory constraint, wherein $d_{ij}$ represents a sampling fraction for one of the switches ($S_j$) ($j\epsilon[1,K]$) and one of the paths ($P_i$) ($i\epsilon[1,N]$), wherein the process is adapted to calculate the sampling fractions that maximize $\Sigma_i (f_i \times T_i)$, wherein $f_i = \Sigma^K_{j=1} d_{ij}$ is the total fraction of flows on the path ($P_i$) to be sampled, $T_i$ is the number of flows traversing on the path ($P_i$).

18. The network element of claim 17, wherein the sampling fractions ($d_{ij}$) are calculated subject to the bandwidth constraint ($\forall j, c\Sigma_i(T_i \times d_{ij}) < B_j$) and the memory constraint of ($\forall j, c\Sigma_i (T_i \times d_{ij}) < M_j$), wherein c is a constant that represents a size of a flow record generated by sampling the flows.

* * * * *

UNITED STATES PATENT AND TRADEMARK OFFICE
CERTIFICATE OF CORRECTION

PATENT NO. : 8,593,958 B2
APPLICATION NO. : 13/232719
DATED : November 26, 2013
INVENTOR(S) : Zhang It is certified that error appears in the above-identified patent and that said Letters Patent is hereby corrected as shown below:

On the Title Page

Item (73), under "Assignee", in Column 1, Line 1, delete "Telefonaktiebologet L M Ericsson" and insert -- Telefonaktiebolaget LM Ericsson --, therefor.

Item (56), under "OTHER PUBLICATIONS", in Column 1, Line 7, delete "2005" and insert -- 2005). --, therefor.

In the Specification

In Column 2, Line 21, delete "anew" and insert -- a new --, therefor.

In Column 8, Line 14, delete "anew" and insert -- a new --, therefor.

In Column 8, Line 58, delete "$S_i$," and insert -- $S_i$ --, therefor.

In the Claims

In Column 13, Line 36, in Claim 5, delete "flows, each" and insert -- flows by monitoring a subset of the flows and recording measurements of the subset of the flows, each --, therefor.

In Column 15, Line 15, in Claim 11, delete "recording a" and insert -- recording --, therefor.

In Column 16, Line 62, in Claim 17, delete "network of" and insert -- network to --, therefor.

In Column 18, Line 6, in Claim 17, delete "and one" and insert -- and the one --, therefor.

Signed and Sealed this
Twenty-second Day of July, 2014

Michelle K. Lee
*Deputy Director of the United States Patent and Trademark Office*